US006650313B2

(12) United States Patent
Levine et al.

(10) Patent No.: US 6,650,313 B2
(45) Date of Patent: Nov. 18, 2003

(54) METHOD AND ADAPTER FOR PERFORMING ASSISTIVE MOTION DATA PROCESSING AND/OR BUTTON DATA PROCESSING EXTERNAL TO A COMPUTER

(75) Inventors: James Lewis Levine, Yorktown Heights, NY (US); Michael Alan Schappert, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 09/843,122

(22) Filed: Apr. 26, 2001

(65) Prior Publication Data

US 2002/0158843 A1 Oct. 31, 2002

(51) Int. Cl.$^7$ ................................................. G09G 5/08
(52) U.S. Cl. .................... 345/156; 345/157; 345/163
(58) Field of Search ............................ 345/156, 157, 345/158, 159, 160, 161, 163, 167, 168, 173, 700, 701, 702

(56) References Cited

U.S. PATENT DOCUMENTS

| | | | |
|---|---|---|---|
| 4,558,313 A | 12/1985 | Garwin et al. ............... | 340/709 |
| 5,661,502 A | 8/1997 | Cheng ........................ | 345/145 |
| 5,825,350 A | * 10/1998 | Case, Jr. et al. ............ | 345/163 |
| 6,081,750 A | 6/2000 | Hoffberg et al. ............... | 700/17 |

FOREIGN PATENT DOCUMENTS

JP          20000200151       7/2000  ........... G06F/00/33

OTHER PUBLICATIONS

R.J. Kamper, et al., pending U.S. patent application Ser. No. 09/204,917, filed Dec. 3, 1998, entitled "Method and Apparatus For Enabling the Adaptation of the Input Parameters For A Computer System Pointing Device".
"Dynamic Speed Adjustment of Pointer Movement", IBM Research Disclosure 42071.
"Improved Usability on a Standard Pointing Device Through Sticky Key Enablement", IBM Research Disclosure 41697.
"Improved Usability on a Standard Pointing Device Through Slow Key Enablement", IBM Research Disclosure 413113.

* cited by examiner

Primary Examiner—Xiao Wu
(74) Attorney, Agent, or Firm—Marian Underweiser, Esq.; Kevin P. Radigan, Esq.; Heslin Rothenberg Farley & Mesiti P.C.

(57) ABSTRACT

Assistive motion data processing and/or button data processing is performed in an adapter on user inputted variable data produced by a pointing device prior to communication to a computer. This processing may include one or more of processing to filter coordinate deviations from a desired path caused by unintended movements of the pointing device; removal of unintentional rapid button transitions of the pointing device; look-back processing to correct for unintentional pointer coordinate motion induced by operation of buttons on the pointing device; and detection of button double-clicks using relaxed requirements on motion and timing. The adapter's processing is transparent to the computer. Provision for user input of selected parameters is provided, as well as switching to allow for user deactivation of the adapter for conventional use of the pointing device.

46 Claims, 10 Drawing Sheets

60

| VARIABLES |
|---|
| DX_IN ........ X MOTION FROM MOUSE ...... 2 BYTE INTEGER |
| DX_OUT .... X MOTION TO COMPUTER ... 2 BYTE INTEGER |
| DX_F ......... FILTERED VALUE ................. FLOATING POINT |
| E_X ........... ROUNDOFF ERROR ............... FLOATING POINT |
| TAU ........... FILTER TIME CONSTANT ..... FLOATING POINT |

METHOD AND ADAPTER FOR PERFORMING ASSISTIVE MOTION DATA PROCESSING AND/OR BUTTON DATA PROCESSING EXTERNAL TO A COMPUTER

CROSS-REFERENCE TO RELATED APPLICATION

This application contains subject matter which is related to the subject matter of the following co-pending application, which is assigned to the same assignee as this application. The below listed application is hereby incorporated herein by reference in its entirety:

"Method and Apparatus For Enabling the Adaptation of the Input Parameters For A Computer System Pointing Device", Ser. No. 09/204,917, filed Dec. 3, 1998 (Attorney Docket No. AUS9-1998-0469).

TECHNICAL FIELD

The present invention relates in general to a method and system for data processing, and in particular, to a method and system for processing motion data and/or button data to be input to a computer from a pointing device.

BACKGROUND OF THE INVENTION

Graphical user interfaces, or "GUIs" as they are often designated, are a common and popular feature of computers, especially personal computers (PCs). One of the many advantages of GUIS is that they allow a user to enter commands by selecting and manipulating graphical display elements, such as icons, usually with a pointing device, such as a mouse. A mouse is an input device which, when moved over a surface, moves a mouse pointer across the computer display in a corresponding manner. Typically, a mouse has one to three buttons which when pressed, generate to the computer an input relating the user and the location of the mouse on the computer display. "Clicking" will be used herein to refer to the pressing and releasing of a mouse button, usually the left mouse button, unless otherwise specified. The icons of a GUI are designed to behave in a manner similar to the objects they represent. The Apple Macintosh™ user interface, Microsoft Windows™ operating environment, and UNIX X-Windows™ are common and very popular examples of GUIs, illustrating that the advantages of GUIs over conventional text-based user interfaces are widely recognized.

Clearly, GUIs significantly reduce the amount of information that a user must recall in order to effectively use the computer. For example, instead of having to remember the name of an application program and navigate by manual typing, the user can search files and launch applications in a more intuitive manner, such as by clicking on well organized buttons and icons. As a result of the ever-increasing popularity of GUIs, a variety of different means for organizing and navigating through the various applications and other programs have been developed.

Organizing means, as referred to above, might be a drop-down or pull-down menu. Drop-down menus are activated by moving the mouse pointer over an active area on a menu. While there can be variations on the menu theme, one such embodiment requires a user to click a button when the mouse is positioned over an active menu. When the application controlling the menu receives the position information of the mouse pointer and the click from the user, the active menu is expanded or dropped down uncovering the menu options of the particular menu type. From those options a user is required to move the mouse to a specific option and click on that option.

While the drop-down menu saves desktop space by only expanding a menu upon a specific action by the user, it has a disadvantage of being somewhat cumbersome for those who do not possess the manual dexterity needed to accurately control the mouse pointer on the screen. Because the dropdown menu, or expanded menu options, stays active only when the pointer is located over the hot spot created by the drop-down menu, if the user allows the pointer to move off of that drop-down menu, the menu automatically closes and the user is forced to reinitiate the drop-down menu procedure described above.

Various methods and apparatus currently exist for allowing a user to control certain aspects of computer mouse operation. For example, the Windows interface enables a user to access a mouse dialog box whereby the user can adjust the tracking speed, which refers to the speed at which the mouse pointer moves across the display, and double click speed, which refers to the rate at which Windows recognizes double clicks of the mouse. One feature of the mouse that is not controllable using the Windows GUI is the responsiveness of the mouse pointer displayed on the display to mouse movement. Clearly, such a feature would be beneficial for use in connection with any type of user interface, but would be especially useful in connection with GUIs having small buttons and selectors, such as the dropdown menu interface described above. Providing means by which a user can control the responsiveness of the mouse pointer provides the user with the capability to prevent, or at least reduce the possibility, of an overshoot. It will be recognized, therefore, that this feature would be especially beneficial in cases where the user is a small child or an older person, neither of whom typically have the manual dexterity necessary to accurately control a mouse or other input device and hence the position of the pointer on the display.

There are a set of disabilities that make the regular operation of a computer difficult, if not impossible. Examples of this are trembling hands/fingers, and numb hands/fingers. As our population grows older and becomes increasingly dependant on computers, this will become more of an issue. These disabilities can result in many difficulties, such as positioning the cursor and use of the mouse buttons. These problems further may include unintended button clicks, unintended movement of the mouse while intentionally clicking, and invalid double-clicks.

Although the processes described hereinbelow could conceivably be added to mouse driver software installed in a PC, this software is highly dependent on the operating system, thus many drivers would need to be written and maintained. Cheng (U.S. Pat. No. 5,661,502) describes such a device driver filter intended to reduce cursor overshoot and related problems for non-handicapped individuals, but this only works for the system it is designed for. In some cases, it may not be feasible to place the filter in the device driver, for example if the operating system does not provide a stable time base for sampling the mouse data. Further, access to, for example, a PC other than the user's PC may be difficult or impossible if it requires installing special drivers and adjusting them to a particular user's needs.

The solution for this is typically the enablement of what are called Slow Keys or Bouncy Keys for the keyboard input device (termed "Mouse Keys"); that is, enablement of the number-pad to function as a mouse input. Since it is still part of the keyboard, no tremble occurs in the mouse movement because it is generated from a key stroke. One disadvantage of this solution is that it is cumbersome in use, particularly for a disabled person.

Therefore, what is needed is a mechanism for enabling a user to better control the responsiveness of a mouse.

SUMMARY OF THE INVENTION

The shortcomings of the prior art are overcome and additional advantages are provided through the provision in one aspect of a method of processing variable data produced by a pointing device for input to a computer. The method includes: ascertaining user inputted variable data produced by the pointing device; performing external to the computer at least one of motion data processing or button data processing on the user inputted variable data to obtain modified user inputted variable data; formatting if necessary the modified user inputted variable data to a standard format used for communicating data from the pointing device to the computer; and transmitting the formatted, modified user inputted variable data to the computer.

In a further aspect, a method of processing variable data produced by a pointing device for input to a computer is provided which includes: receiving user inputted variable data produced by the pointing device; performing external and transparent to the computer at least one of motion data processing or button data processing on the user inputted variable data to obtain modified user inputted variable data, wherein the motion data processing or button data processing includes processing to accomplish at least one of (1) filtering to reduce coordinate deviations from a desired path caused by unintended movements of the pointing device, (2) removal of unintentional rapid button transitions of the pointing device, (3) look-back processing to correct for unintentional pointer coordinate motion induced by operation of buttons of the pointing device, or (4) detection of button double-clicks using relaxed requirements on motion and timing; formatting, if necessary, the modified user inputted variable data to a standard format used for communicating data from the pointing device to the computer; and transmitting the formatted, modified user inputted variable data to the computer.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
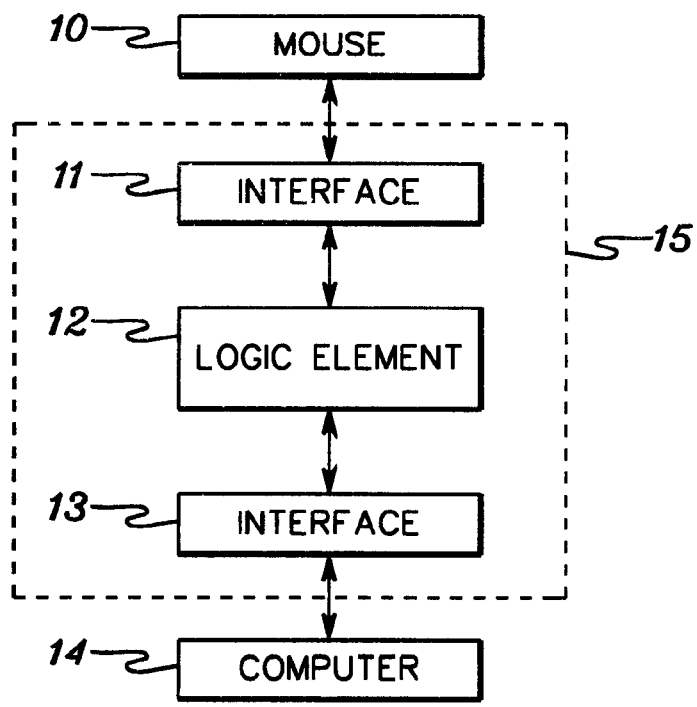
FIG. 1 is a block diagram of one embodiment of an adapter 15 in accordance with the present invention, shown disposed between a computer mouse 10 and a computer 14.

Generally stated, presented herein is a technique for performing motion data processing or button data processing external to a conventional computer in order to correct for certain user induced errors in the variable data output by a computer pointing device, such as a mouse. In one embodiment, an adapter is inserted between a mouse and a computer.

The adapter, which includes logic processing in accordance with the present invention, receives variable data from the mouse reflecting changes in mouse position and/or button state. One or more algorithms are applied to the variable data and the resultant modified data is formatted and passed to the computer. The formatting is such that the modification to the variable data performed by the adapter is transparent to the computer, i.e., the computer understands the modified data as having come directly from the standard mouse.

The logic processing implemented by the adapter may include digital motion filters to suppress cursor jitter, algorithms to reject inadvertent button depressions, stationary-point detection algorithms to correct inadvertent mouse motion while pressing buttons, and algorithms to improve a user's ability to perform double-clicks acceptable to the computer. The adapter may either be disposed between the pointing device and the computer or, in one embodiment, integrated within the pointing device.

The advantages of such an adapter over modifying, for example, software drivers within the computer, is that the adapter can be used with any computer, or any operating system, and with various mouse or other incremental pointing devices which support, for example, a standard mouse data exchange format. In a second and related form of the invention, a special mouse can be provided in which the adapter functions are integrated within the mouse itself. One further enhancement described herein is to provide a switch to disable the above summarized processes for individuals without disabilities, i.e., return the pointing device to its conventional functioning.

In one embodiment, an adapter in accordance with the present invention may include a microcontroller chip or other suitable logic element connected between a PC compatible mouse (such as an IBM PS/2 compatible mouse), and a PC compatible mouse port of a computer so equipped, with the chip/logic element receiving power from the latter and providing interface support for both the mouse and the PC mouse port. Many other arrangements are possible, including serial or USB port mice, separate power supplies, and additional chips/logic elements to provide the interfaces.

In addition, the adapter may be provided with a set of switches to adjust the motion data processing or button data processing (referred to herein as the algorithms) to suit an individual's needs, and/or parameters may be transmitted to the adapter from the computer. These parameters may be stored in an electrically erasable, nonvolatile programmable memory (EEPROM) in the adapter for later use. In an alternate form, the microcontroller installed in every standard mouse can be replaced by a more powerful controller capable of supporting both the normal mouse functions and the algorithms. Again, there may be a set of switches to supply parameters, or the parameters may be transmitted from the computer and stored in an EEPROM at the adapter. In either case, the adapter is preferably programmed with at least one of the following four algorithms.

Process A1 is a button algorithm to reject unintentional brief button clicks. This algorithm requires that a change of button state persist for a predetermined length of time before the change is passed on to the computer. The times for the up-to-down and the down-to-up transitions are separately adjustable.

Process A2 is a digital smoothing algorithm to reduce the effects of hand tremor. As described below, this is a non-standard digital low-pass filter designed especially for the filtering of mouse motion increments and their conversion to integer values compatible with the standard mouse data format. The filter time constant is adjustable to an individual's needs.

Process A3 is a stable-point algorithm to correct for inadvertent mouse motions which may accompany button clicks. This algorithm makes use of a short record of recent cursor motions to locate a time at which the mouse was stationary prior to a button click. Any coordinate increments which occur between the stationary time and the click time are sent to the PC with reversed signs to position the cursor correctly. This is a modification of a technique described in a touch-screen patent, U.S. Pat. No. 4,558,313, which is hereby incorporated herein by reference in its entirety. There are 3 adjustable parameters to this processing, i.e., the maximum look-back time, the X and Y tolerance defining the stable point, and the required duration of the stable point.

Process A4 is a process to simplify double-clicking for those who have trouble clicking fast enough, and with small enough intervening mouse motion, to satisfy the operating system's requirements for a valid double click. This processing detects a double click using parameters optimized for the individual, and then transmits two simulated clicks to the computer which satisfy the operating system's requirements.

Note that, although intended primarily for those with manual disabilities, an adapter as described herein is of potential benefit to any computer user. Also note that many incremental pointing devices designed to interface to a standard input device port, such as a trackball, can be used in place of a mouse, with similar benefits.

In FIG. 1, one embodiment of a generalized hardware configuration is shown for an adapter in accordance with the present invention. This adapter includes a microcontroller or other logic element 12, an interface 11 between element 12 and a conventional mouse 10, and an interface 13 between element 12 and a computer 14 (such as a PC). Power to adapter 15 may be supplied in any convenient manner.

Figure 2:
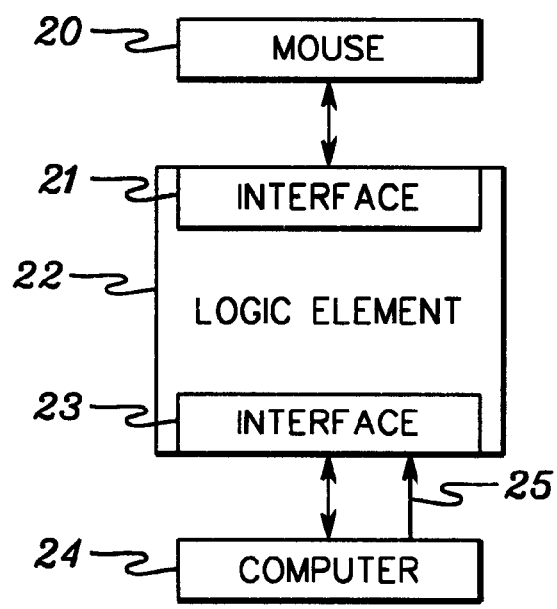
FIG. 2 is a block diagram of a further embodiment of an adapter in accordance with the present invention, in which certain elements of the embodiment of FIG. 1 are incorporated into a single logic element 22 disposed between a computer mouse 20 and a computer 24.

In FIG. 2, an alternate embodiment of an adapter 22 is shown, wherein interface 21 to mouse 20 and interface 23 to computer 24 are integrated in the logic element of the adapter 22. Power 25 is supplied in this example by computer 24, e.g., through its mouse port.

Figure 3:
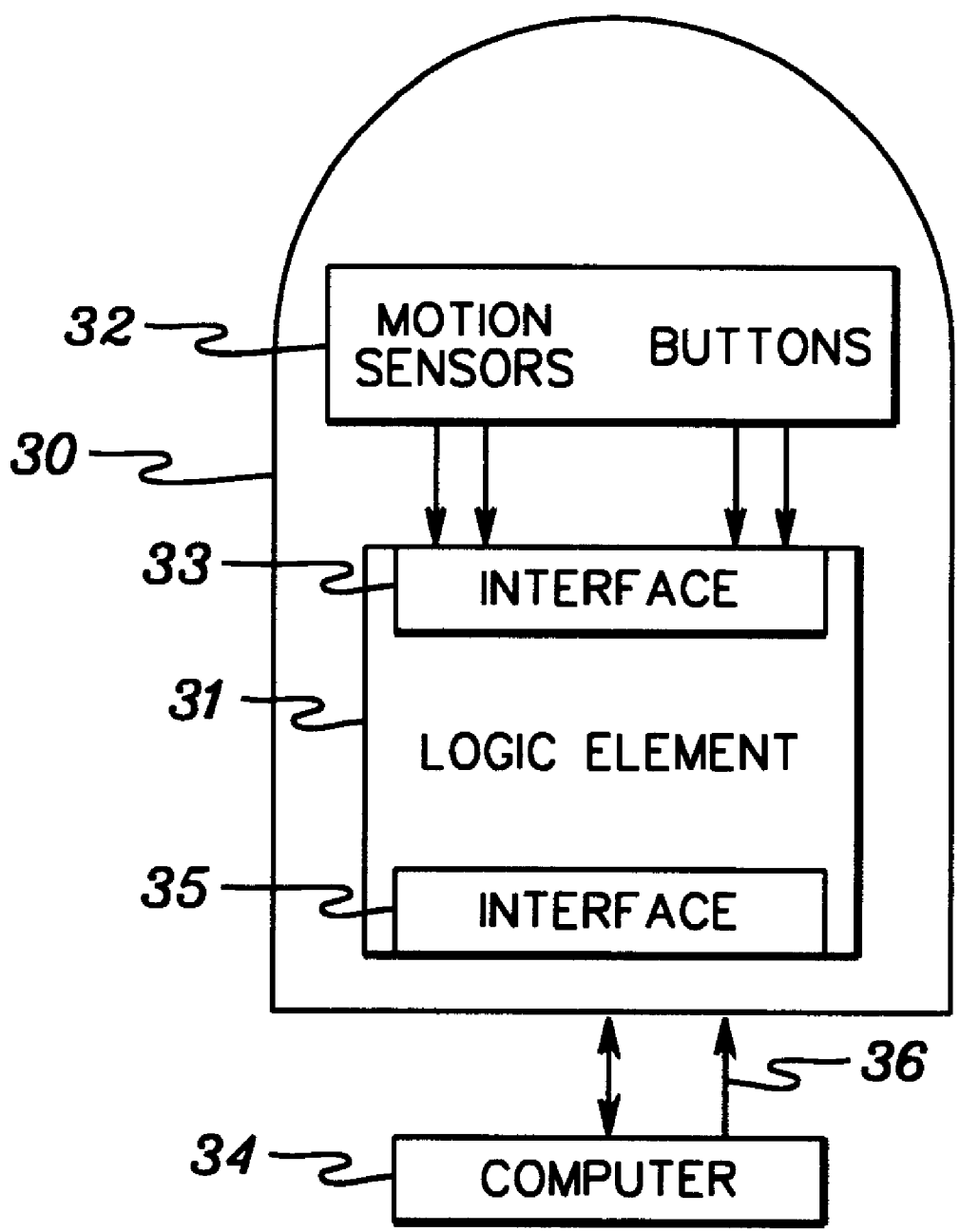
FIG. 3 is a block diagram of a still further embodiment of the present invention, in which a logic element 31 is placed within a special computer mouse 30, to interface directly with the mouse motion sensors and buttons thereof.

Another embodiment of a hardware configuration in accordance with the present invention is shown in FIG. 3. In this embodiment, functions are provided by substituting a higher performance logic element for the conventional logic in a standard mouse, indicated here by shell 30. Logic element 31 is connected to mouse motion sensors and buttons 32 by an interface 33, and to a computer 34 by an interface 35. Power is supplied 36 by the computer through the computer's mouse port.

Software Overview

As described more fully in the following sections, the mouse normally runs in a "streaming" mode, in which it transmits data only when motion occurs and/or a button changes state. If either occurs, the mouse sends data packets to the computer reflecting the changes, with a minimum sampling time between transmissions, say Ts. Ts is typically 25 ms, corresponding to a maximum rate of 40 transmissions per second. A standard data packet is 3 bytes, holding motion increments in the X and Y directions as well as the state of the mouse buttons. However, algorithms A1–A4 mentioned above and described herein are time sensitive and must be executed periodically, not just when the mouse sends data. Therefore, during power-up initialization, the adapter processor sends a command to the mouse which causes it to enter "remote" mode. In this mode, the mouse does not initiate data transfers, but instead waits for a special command from the adapter. When the mouse receives this command, it sends a full data packet, including both motion and button data, even if no changes have occurred.

The adapter processor then applies its processing algorithms to the mouse data, and passes modified, properly formatted motion and button data to the computer if any changes have occurred. The adapter thus operates in an endless loop, in which it repetitively requests data from the mouse, processes the received motion and button data, and sends data to the computer. The loop time is set to a value compatible with the mouse and the computer's operating system, e.g. 25 ms, by adding a time delay to the loop or by making use of a timer built into the adapter's processor.

Figure 4:
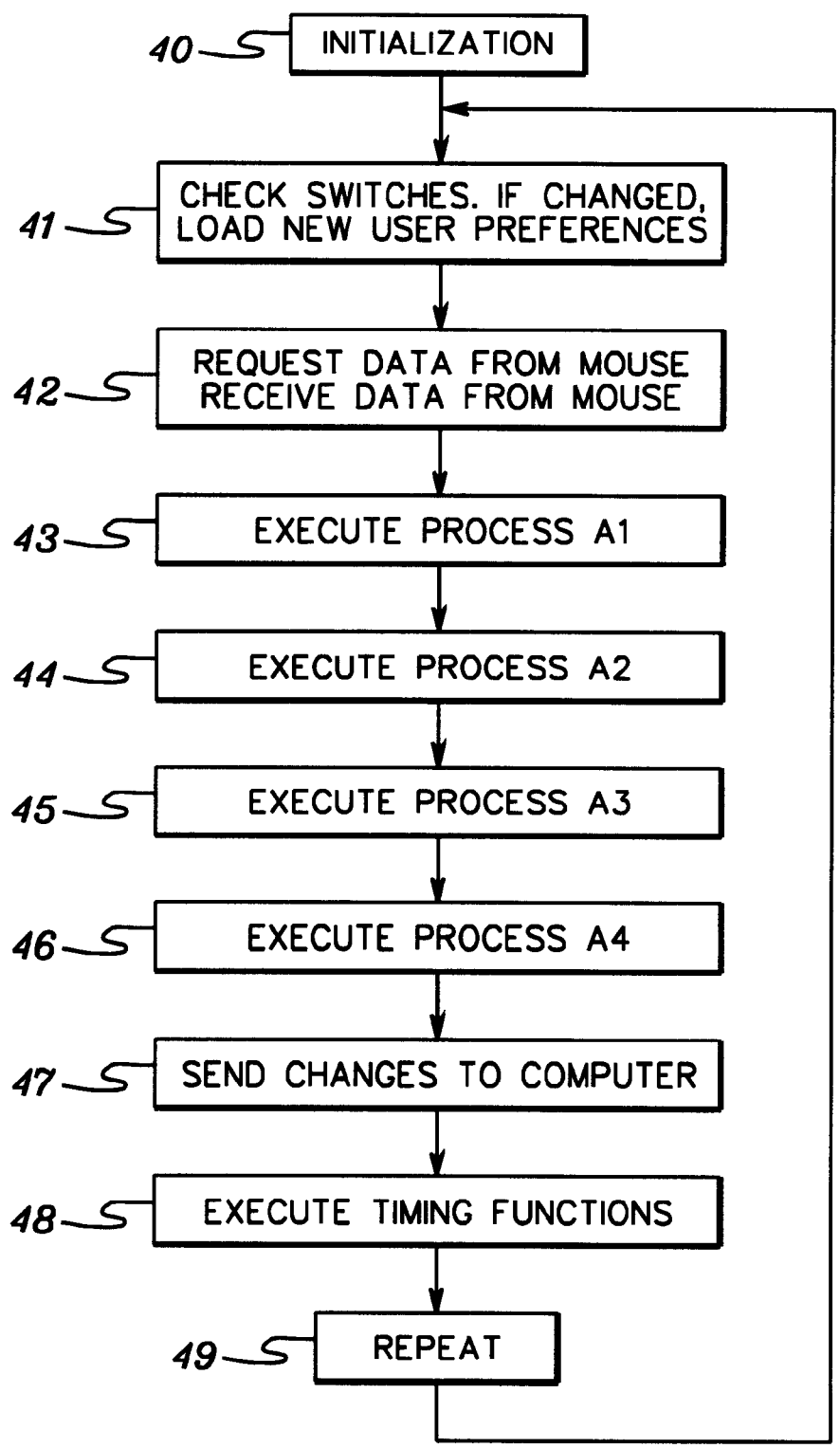
FIG. 4 is a flowchart of one embodiment of generalized processing to be executed by the logic elements of FIGS. 1–3 in accordance with one aspect of the present invention.

One embodiment of this loop is illustrated in the flowchart of FIG. 4. After initialization 40, the adapter processor enters the loop. An optional set of switches are checked 41. If a change has occurred, a user profile of is loaded corresponding to the current switch settings. The processor then sends a request for data to the mouse and receives it 42. At steps 43 through 46, processes A1 through A4 noted above and described further below are executed. Changes in data are sent to the computer 47, and a time delay is inserted or the timer is checked 48. Other time related functions are performed in this step, which are described below. The processor then loops back to request more data from the mouse 49. Note that because the loop time is fixed, algorithms which need time information can obtain such information by incrementing or decrementing a counting variable once per loop.

Button Algorithm (A1)

A mouse user's fingers normally rest on or just above the mouse buttons, so that users with certain neuro-motor disabilities may click the buttons inadvertently. These clicks are often of very brief duration. This algorithm is intended to aid such individuals, by ensuring that if a button changes state (i.e. from up-to-down or down-to-up), it must stay in that state for a minimum time before the change is passed to the computer. Different delays may be required for the two possible changes, and these are made adjustable to suit individual needs. In general, the time required to accept a button release, Tr, can be shorter than the time required to accept a button depression, Td. As noted above, the timing can be done by counting loops of the main program. Thus, a 125 ms delay corresponds to 5 loops through the main program.

Figure 5:
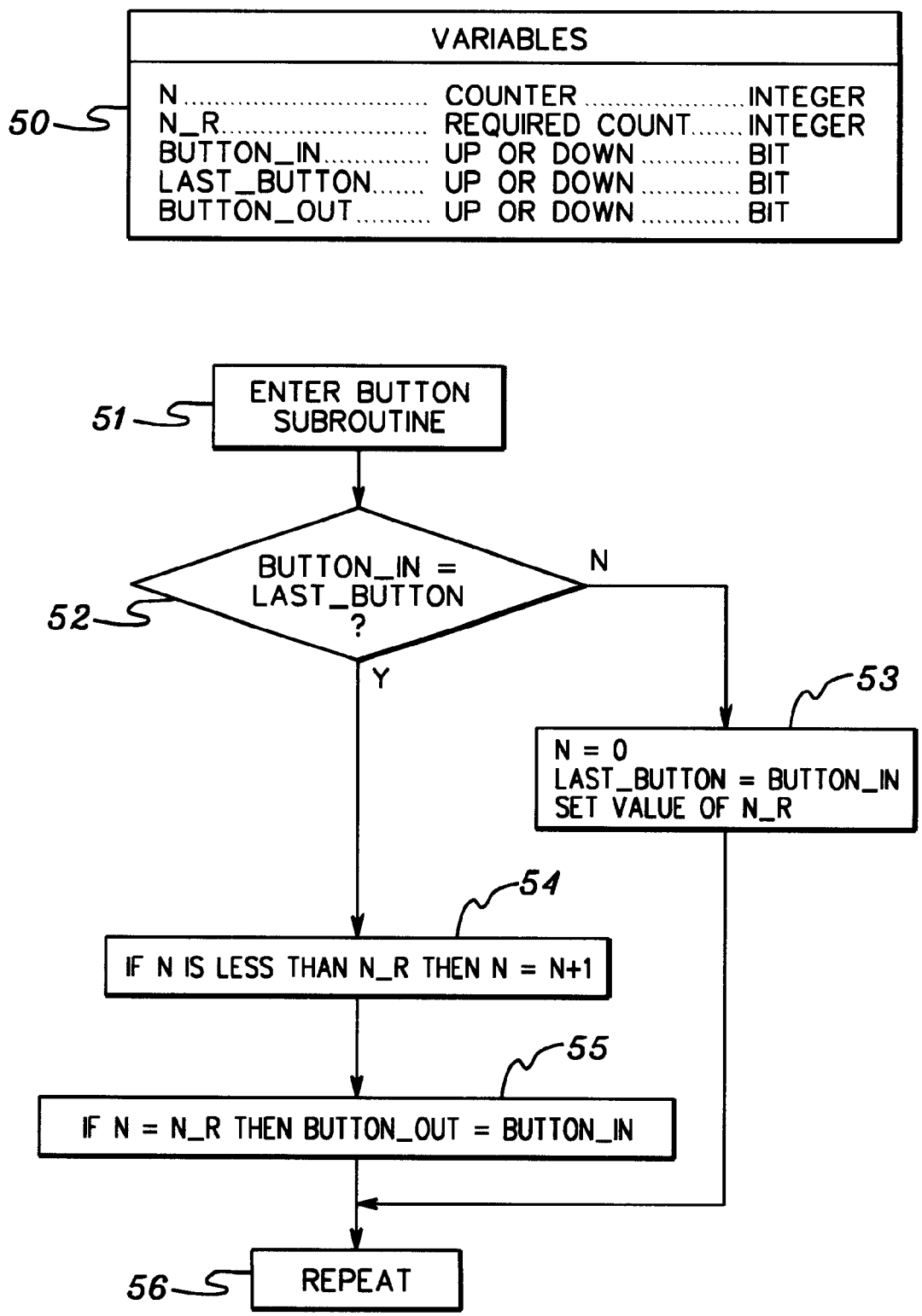
FIG. 5 is a flowchart of one embodiment of process A1 of FIG. 4 to reject inadvertent rapid mouse button clicks in accordance with one aspect of the present invention.

One embodiment of this button processing is shown in FIG. 5 for one mouse button, with the variables being defined at key 50. The variable BUTTON_IN represents the state of the button just before entering button processing 51. The variable LAST_BUTTON defines the button state from the previous loop through the code. Counter variable N is used for timing, while N_R represents the desired time delay. More precisely, the delay time is N_R*Ts where Ts is the time per loop. Variable BUTTON_OUT is set equal to the input button state if the timing condition is met, i.e., if N=N_R.

The code is entered 51 each time new data is obtained from the mouse. A test is made to see if the button state has changed from the prior state 52. If yes, then the button processing is executed 53. This resets count N to zero, sets LAST_BUTTON to reflect the new button state, and sets N_R to reflect the appropriate time. That is, if the button has been depressed, this processing sets N_R to the desired value for accepting a button depression. If the button was released, this processing sets N_R to a value appropriate for accepting a button release. (The actual code is trivial.) The subroutine is then exited 56. If the button has not changed state, then the processing 54 is executed, which causes the counter N to increase by one provided it has not already reached N_R. Finally, a test is made to see if N has reached N_R 55. If it has, then BUTTON_OUT is made equal to BUTTON_IN. In a separate step, this change is detected and transmitted to the computer.

Filter Algorithm for Mouse Increments (A2)

Mouse motion data includes integer increments dX and dY, which represent the motion of the mouse, for example 8 counts per mm in the X and Y directions. The increments are accumulated by the mouse and transmitted to the computer periodically, typically every 25 ms provided that motion occurs and/or a mouse button changes state. If neither occurs, the mouse does not send data to the computer. If motion occurs, the transmitted numbers are proportional to the product of mouse velocity and the fixed time between transmissions. In the computer, the increments are summed in the device driver program to obtain integer coordinates X and Y, which are used to position the cursor on the display screen. The X and Y values are adjusted when necessary to keep the cursor within the display screen boundaries. In many cases, a nonlinear function is applied by the computer to the increments prior to summing in an attempt to improve control of the cursor, usually by enhancing the effect of large increments relative to small ones.

One processing method would be to apply a conventional digital smoothing filter to the X and Y values by adding suitable code to the device driver of the computer. Such filters can use either floating point arithmetic, or can use fixed point arithmetic with scaling and remainder control. In the case of an external adapter and external processing, however, the filter must be applied to the increments.

In this case, a problem arises because the mouse data format only provides for the transmission of integer values to the computer. However, the result of applying a smoothing filter to an increment, say dX, is a sequence of much smaller and decreasing values, say dX(i), which must be rounded to integral values prior to transmission. In the process, small values less than 0.5 would be rounded to zero and effectively lost. This results in a nonlinear filter, which follows the mouse motion properly only for large increments (i.e., high mouse velocity), and falls further and further behind for small increments (i.e., small mouse velocity). Below a certain velocity, the cursor does not follow at all and becomes stuck. These effects are illustrated with a simple example, using a standard recursive filter which emulates a single stage analog low-pass filter. The results differ only in detail for other types of filters, for example finite impulse response filters. Thus, assume the mouse data is sampled at times Ti:

$$T(i)=iTs \quad i=1,2,3, \tag{1}$$

Here, Ts is the sampling time interval, typically 25 ms for a mouse. At each time T(i), let the mouse increment in the X direction be dX(i). Then the filtered increments, e.g., dXf(i) for a conventional recursive low-pass filter with smoothing time constant Tau=NTs, are:

$$dXf(i)=dXf(i-1)=[dX(i)-dXf(i-1)]/N \tag{2}$$

A typical value for N is in the range 2–20. The calculation is identical for the Y direction. The outputs to the computer, say dxr(i) are obtained by conventional rounding:

$$dXr(i)=\text{round}(dXf(i)) \tag{3}$$

Thus, for N=3 and dX(i)=5 for i=1, and 0 for i>1, the following is found:

$$dXf(i)=1.666 \; 1.111 \; 0.740 \; 0.493 \; 0.329 \; 0.219 \; 0.146 \; 0.097 \tag{4}$$

$$dXr[i]=2 \; 1 \; 1 \; 0 \; 0 \; 0 \; 0 \; 0 \tag{5}$$

An important property of equation (2) is that the sum of the filtered increments dXf(i), prior to rounding, converges to the sum of the unfiltered increments dX(i), for i>>N. Thus, the sum of the terms in equation (4) approaches the input value 5. Because the device driver of the computer calculates the coordinates by summing all the increments which it receives from the mouse, the cursor motion would ideally follow the mouse, apart from the desired smoothing of rapid jitter and the inherent delay introduced by the low-pass filtering, if it were possible to transmit the increments including the fractional parts. However, only integers can be transmitted to the computer, so that rounding is required. The effect of this rounding is to destroy the desired linear relationship between input and output, making it difficult to position the cursor. Thus, for the above simple case, the sum of the terms in equation (5) is only 4, rather than 5. For inputs below 2, all outputs are 0, and the ability to do fine positioning is lost. This problem is further exacerbated by the nonlinear function applied by most mouse driver software, which further suppresses small increments relative to large ones, and by the use of larger values of tau (larger N).

Figure 6A:
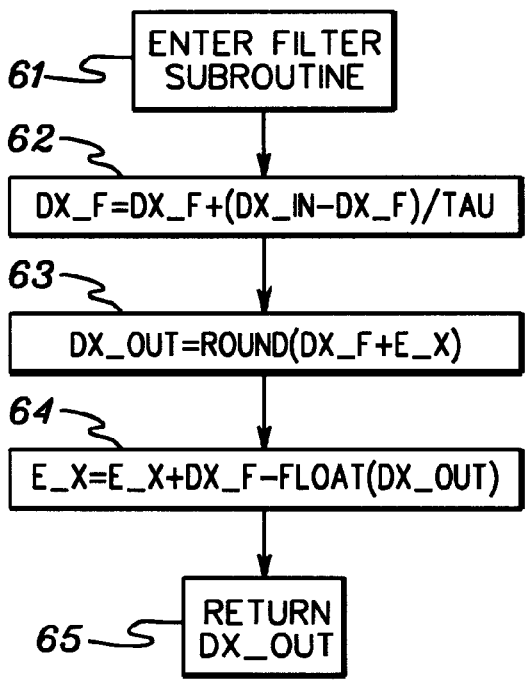
FIG. 6 is a flowchart of one embodiment of process A2 of FIG. 4 of a floating point mouse motion filter in accordance with one aspect of the present invention.
Figure 6B:
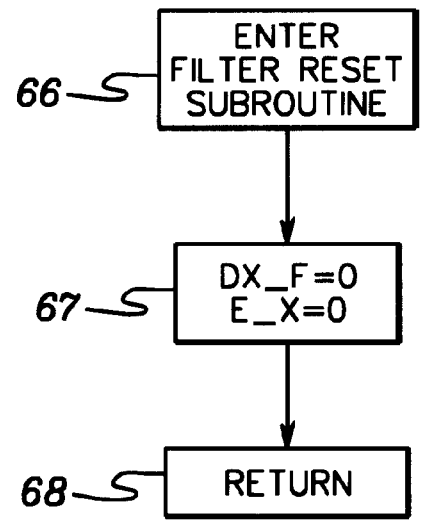

Two solutions to this problem have been found. In one solution, the fractional remainders after rounding, which would normally be discarded, are calculated, accumulated, and used to correct the rounding processing in subsequent steps. In the second method, intermediate variables X and Y are first calculated by summing the inputs dX and dY. At each sampling interval, the X and Y (not the increments) are filtered, subtracted from the prior values, and then rounded to provide output increments. This second method is mentioned for completeness, as the procedure is no better than the first solution and requires extra computation. The first method is illustrated in equations (5a) to (5c), which form the basis for processing to be executed after each sampling interval. This processing is illustrated in the flowchart of FIG. 6. An error term E_x(i) is introduced, which is the accumulated difference between the filtered increments dXf(i) and the rounded valued dXr(i). This term is initialized to zero, as is dXf(i). All calculations are done using floating point arithmetic. The processing is:

$$dXf(i)=dXf(i-1)+(dX\_in(i)-dXf(i-1))/N \quad (5a)$$

$$dXr(i)=round[dxF(i)+E\_x(i-1)] \quad (5b)$$

$$E\_x(i)=E\_x(i-1)+[dXf(i)-dXr(i)] \quad (5c)$$

In step (5a), the new filtered value dXf(i) is calculated using the prior value dXf(i-1) and the latest unfiltered increment dX(i). In step (5b), the error from the previous step E_x(i-1) is added to the filtered value and rounded to form an integer value dXr(i) for transmission to the computer. Finally, in step (5c), the new error term E_x(i) is computed by adding the round-off error [dXf(i)-dXr(i)] to the previous error term E_x(i-1). The key to this calculation is the use of an accumulated error term. Even after the rounded increments reach zero, the error term continues to grow until the rounded term dXr(i) is non-zero and an increment is then sent to the computer. This continues until the sum of the increments dX(j) equals the input value dX(i), at which point the error term becomes zero. The improvement over the previous example is illustrated in equation (5d) below:

$$dXr[i]=2\ 1\ 1\ 0\ 0\ 1\ 0\ 0 \quad (5d)$$

Note the extra pulse at the 6th interval. This brings the total number of pulses to the input value 5, as desired. Furthermore, an input increment of 1 is no longer lost, allowing fine positioning of the cursor.

Referring to FIG. 6, upon entering the subroutine 61, equations (5a) through (5c) are executed at corresponding steps 62 through 64, and the result is returned 65. Although not shown, identical calculations are performed on the Y data. A separate subroutine, entered at 66, is used to initialize the filter variables 67. This is done at startup, and whenever it is necessary to stop the cursor motion. For example, human factors are improved by stopping cursor motion whenever a mouse button is pressed, and whenever the mouse is motionless for a few sample intervals. This is easily tested for in the main program loop following the execution of the button algorithm A1.

Figures 7A, 7B:
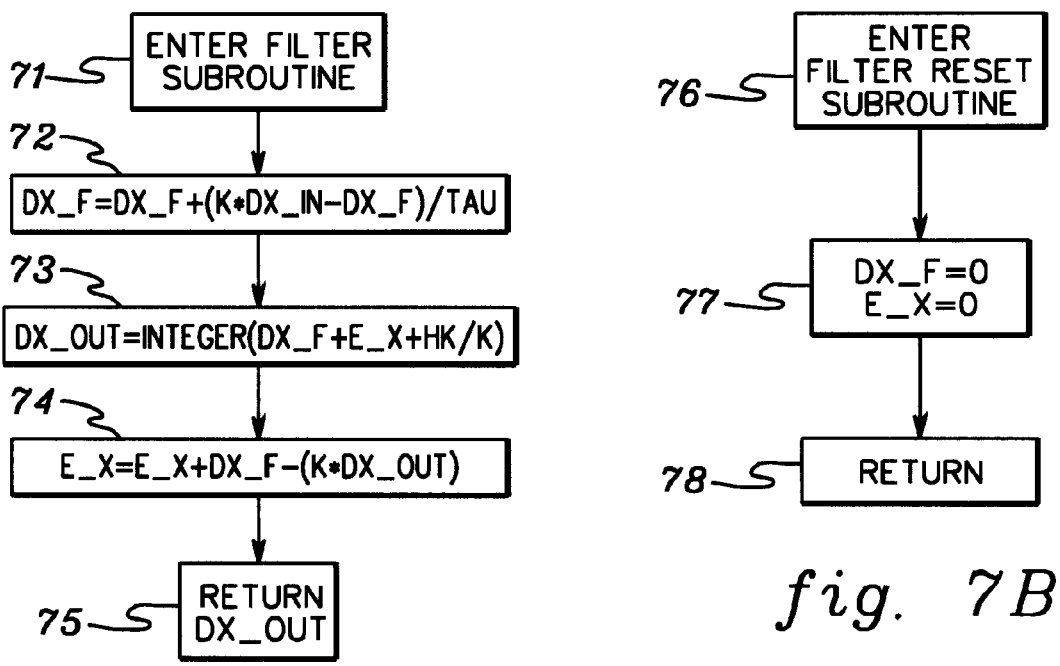
FIG. 7 is a flowchart of an alternate embodiment of process A2 of FIG. 4 for a fixed point mouse motion filter in accordance with one aspect of the present invention.

The processing of equations (5a) through (5c) assumes that the adapter logic can perform floating point arithmetic. Low-cost processors are often too slow to do this in real time. The calculation can be done much faster in fixed point arithmetic using 3 or 4 byte integers and proper scaling of the data. This is illustrated in FIG. 7, whose steps 71 through 78 correspond to steps 61 through 68 of FIG. 6. The data is scaled by multiplying by a large number K in step 72, where the calculation is done using so-called long integers (3 or 4 bytes) instead of short integers (1 or 2 bytes). In step 73, the factor K is divided out and the results converted back to a short integer for transmission to the computer. The accumulated error term is calculated in step 74, which involves a final multiplication by K with conversion to a long integer. This works as well as the floating point version, and is much faster. The factor HK=K/2.0 can be used to round the numbers to the nearest integer value.

If the filter time constant tau is set to a large value to suppress the effects of very large tremors, the exponential decay of the filter output may persist for a long time after the mouse motion ceases. This motion is easily stopped by resetting the filters using step 66 (FIG. 6) or step 76 (FIG. 7), whenever the increments from the mouse cease for a predetermined period of time, e.g., for a few sample times Ts. The timing code, located just after entering filter processing (61 or 62), is omitted from the flowcharts of FIGS. 6 and 7 for clarity.

Stable-Point Mouse Motion Correction Algorithm (A3)

This processing was derived from a way to correct for disturbances which occur with touch screens when the removal of a finger is used to indicate a button click (see the above-referenced U.S. Pat. No. 4,558,313). In U.S. Pat. No. 4,558,313, this processing was applied to coordinates X and Y, rather than incremental changes dX and dY, and has been accordingly modified to handle the latter case. The basic principle is to maintain, in circular stacks, a record of past coordinates. A circular stack is a computer buffer which is manipulated in such a way as to always hold a predefined number of the most recent stored values. When finger liftoff is detected, the stacks are searched to see if the finger had been stationary for a predetermined time before liftoff. If so, the coordinates of the stationary or stable point are substituted for the disturbed coordinates measured as liftoff occurred.

In the case of a mouse, inadvertent motion during the use of buttons is a well known problem. It can be much worse for individuals with neuro-motor disabilities. As with the smoothing filter, it is necessary to apply the stable point algorithm to increments rather than actual coordinates. In particular, the increments dX and dY are stored in stacks after each time interval Ts. When a button change is detected (e.g., after the button and filter algorithms A1 and A2 have been applied), the stacks are searched for a time span at which the increments were small, ideally zero. The increments between that time and the time of button change, which are still in the stack, are then sent to the computer with their signs reversed, thus restoring the cursor to its intended position. Note that it is necessary to send each point to the computer, rather than accumulating the total distance and sending that to the in one transmission. This is because the nonlinear scaling applied to the increments by the operating system magnifies the effect of a single large increment compared to a number of small ones.

Figure 8A:
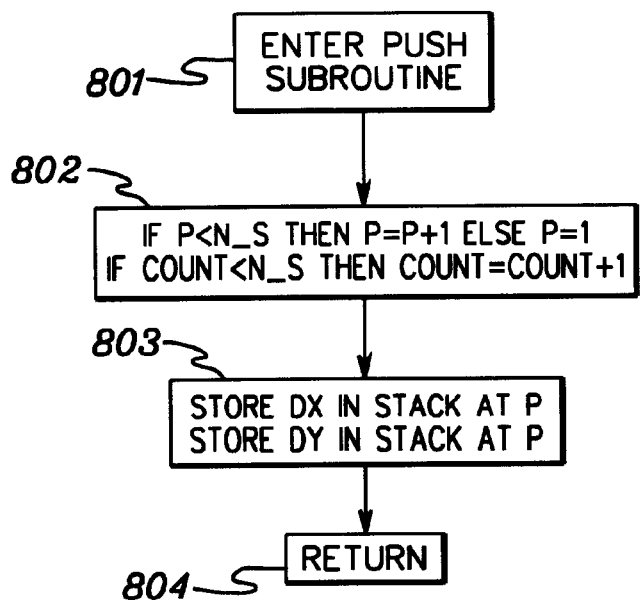
FIGS. 8a and 8b are flowcharts of one embodiment of process A3 of FIG. 4 in accordance with one aspect of the present invention to correct for inadvertent mouse motion which may occur when a button is clicked.
Figure 8B:
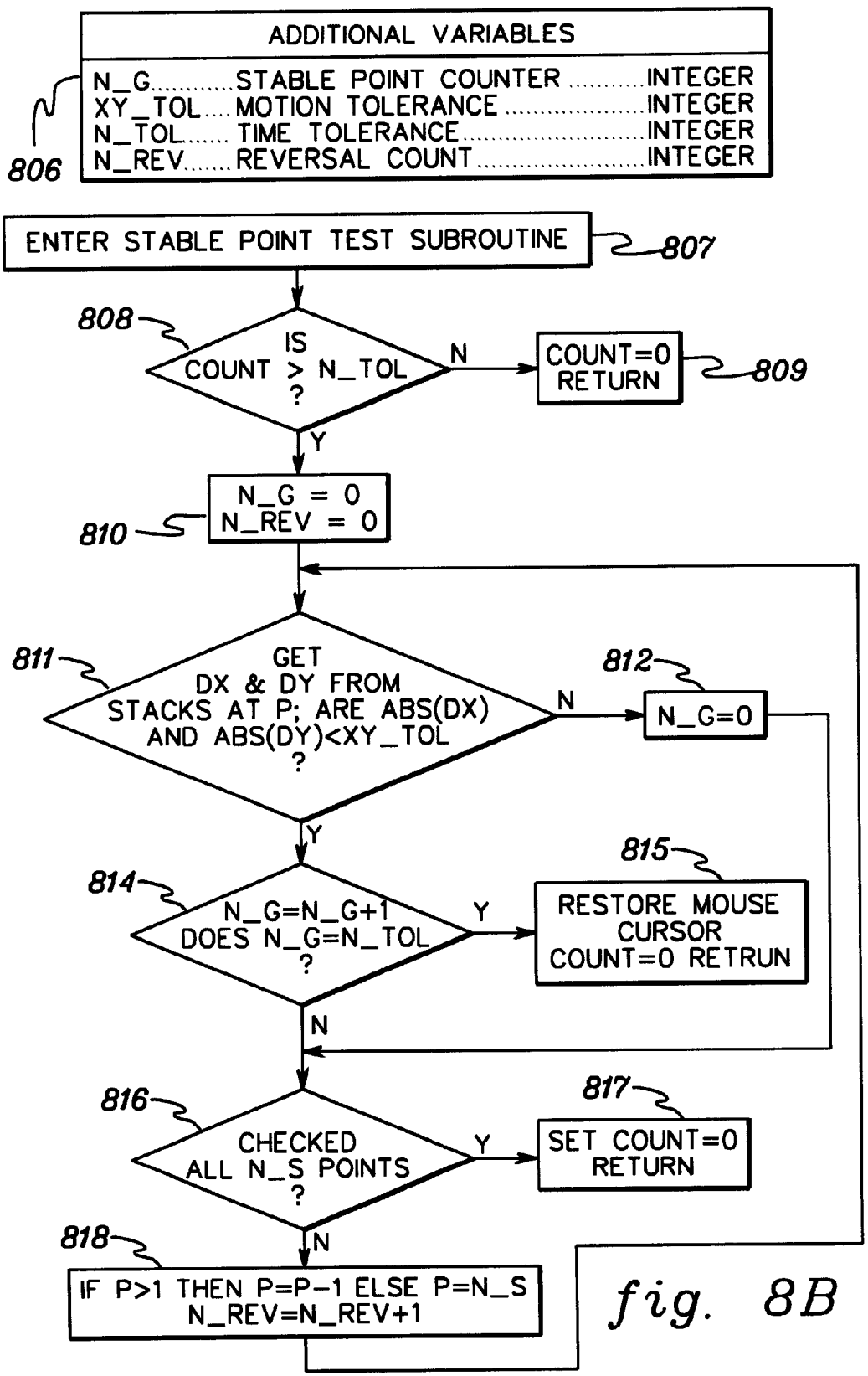

One embodiment of A3 processing is illustrated in FIGS. 8a and 8b. Referring to FIG. 8a, certain of the variables are defined in key 800. There are two stacks, which are arrays of integer values indexed by a pointer variable P. The stacks have a length N_S. Each time motion increments are to be stored, P is first incremented by 1. However, after it reaches the end of the stack (i.e., P+N_S), it is set back to 1 rather than incremented. In this way, the stack always contains the latest motion increments. An auxiliary variable COUNT is incremented after each use of the stack until it reaches the stack size N_S, after which it is left alone. This is used to determine the number of valid points in the stack before it has been completely filled. Setting COUNT to 0 effectively empties the stacks.

The subroutine of FIG. 8a is entered 801 once per execution of the main program loop, i.e., every Ts seconds. This subroutine call is made, e.g., in block 48 of FIG. 4. At step 802, the pointer P is adjusted. If P is less than N_S, it is incremented by one, otherwise it is set to point to the beginning of the stack, i.e., P is set to 1. The latest value of dX is then stored in stack DX_S at the portion indexed by P, while dY is stored in the DY_S stack 803. The result is that, once the stack has been completely the next value of dX will replace the oldest value. Therefore, the stacks always hold the latest values of DX and DY. The value COUNT is also incremented at 802, but only up to N_S. Thus, the value of COUNT indicates the number of valid points added to the stacks from the time when it was last set to 0.

The processing of FIG. 8a is executed repetitively until a button changes state. At that time, the process of FIG. 8b is entered 807 to search for a stable point. By way of example, this call is from step 45 of FIG. 4. The additional variables used are defined in key 806. For this subroutine, a stable point is defined as a contiguous region in the buffer for which the absolute values of both DX and DY are less than a tolerance XY_TOL for a predefined number of samples N_TOL. The number of good points which satisfy this test is counted by variable N_G. We note that when the subroutine 807 is entered, the stack pointer P points to the most recent increments already sent to the computer.

First, a test is performed 808 to ensure that the stack contains enough data points to satisfy the test condition, i.e., at least N_TOL. If not, the stack is emptied in 809 by setting COUNT to 0, and the subroutine exits. Otherwise, a search is begun backwards through the buffer (i.e., back in time) starting at the latest point. In this way, the most recent stable point, if any, will be found. First, the counter N_G is set to zero 810, as well as a variable N_REV whose use is described below. Next, a loop is entered at step 811. In 811, the absolute values of dX and dY from the stack at position P are tested to see if they are less than the tolerance XY_TOL. If not, the counter N_G is set back to zero 812 and the loop is reentered at 816. If they are, the counter N_G is incremented, and a test is made 814 to see if N_G is equal to the required value N_TOL. If it is, then a stable point has been found. The cursor is then returned to the stable point 815. This is done by sending to the computer the points in the buffer between the starting point, when the subroutine was called, and the stable point with reversed signs. This is simplified by the use of the variable N_REV, which is incremented after each loop 818. After reversal, COUNT is set to zero in step 815 to empty the stacks and the subroutine exits. If N_G is less than N_TOL at step 814, then a test is made to see if all the valid points in the stacks were checked 816. If so, the routine exits after emptying the stacks without having found a stable point 817. Otherwise, the pointer P is adjusted to point back 1 step in time 818. It then loops back to 811 to continue the search.

In one embodiment, there are three parameters which can be adjusted to suit a user's needs. First, the maximum "look-back" time, which is N_S*Ts. Second, the value of XY_TOL, which indicates how much motion is allowed at a stable point. Finally, the time N_TOL*Ts for which the increments must be small. Typical values for N_S are 10–30, for XY_TOL 1–3, and for N_TOL 3–5. In addition, there is a choice to be made as to the type of button change at which the subroutine 807 (FIG. 8b) is to be called, i.e., whether to call the routine on a button-down change, a button-up change, or both. The choice depends on how the mouse buttons are used by the operating system. For Microsoft's Windows™ operating system, calling subroutine 807 on a button-down change is generally the preferred choice, but a parameter can be provided to select either of the three possibilities.

Double Click Support (A4)

A double click, consisting of two down-up clicks of a mouse button, usually the left one, is often used to initiate certain actions. Such pairs of clicks are distinguished from other pairs by requiring the clicks to be close together in both time and space. In some cases, it is possible to adjust the allowable time and/or space using software provided with the operating system of the computer, but not always, and usually not to the extent which may be required for some individuals.

Figure 9A:
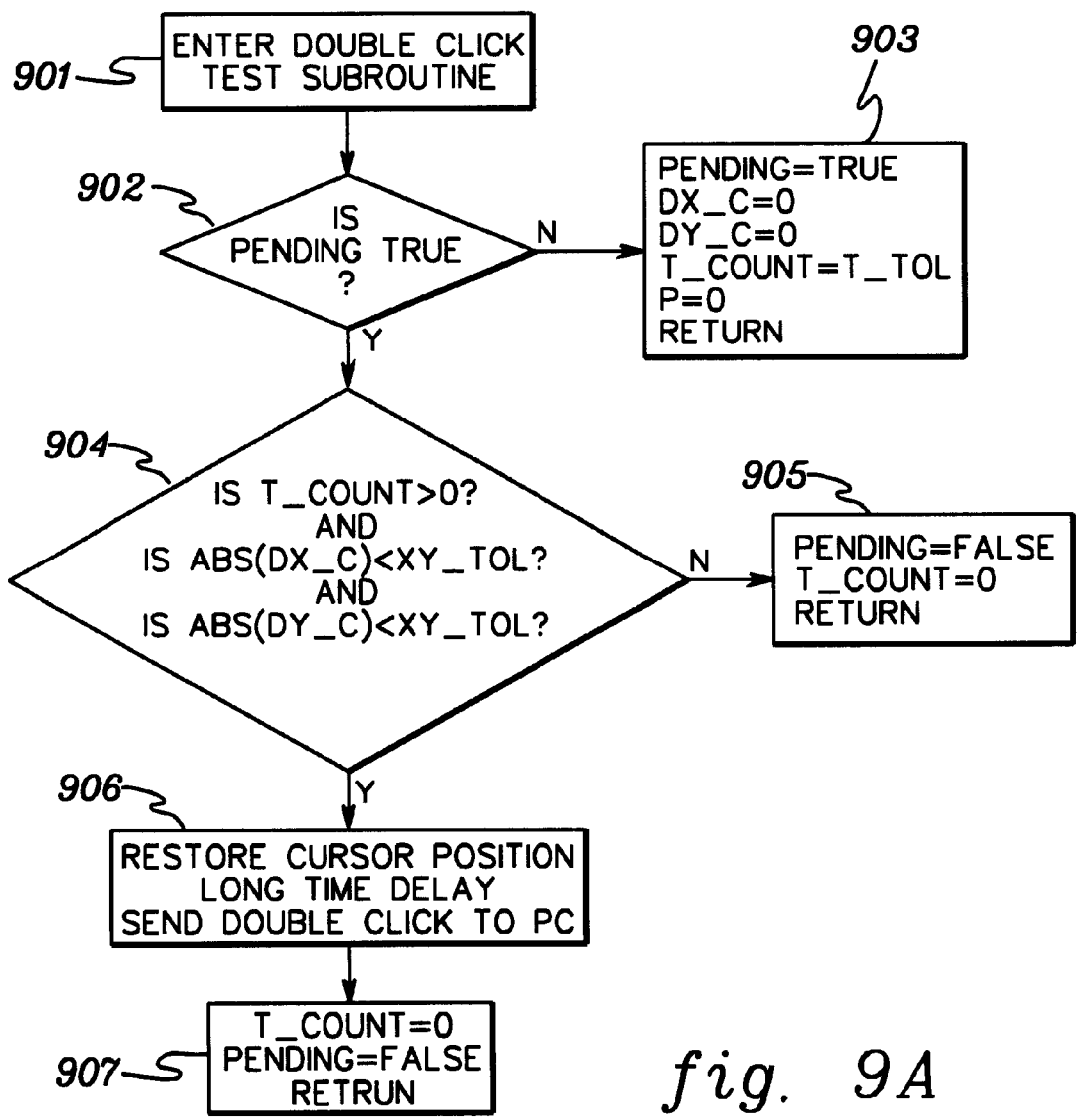
FIGS. 9a and 9b are flowcharts of one embodiment of process A4 of FIG. 4 in accordance with one aspect of the present invention to simplify double clicking.
Figure 9B:
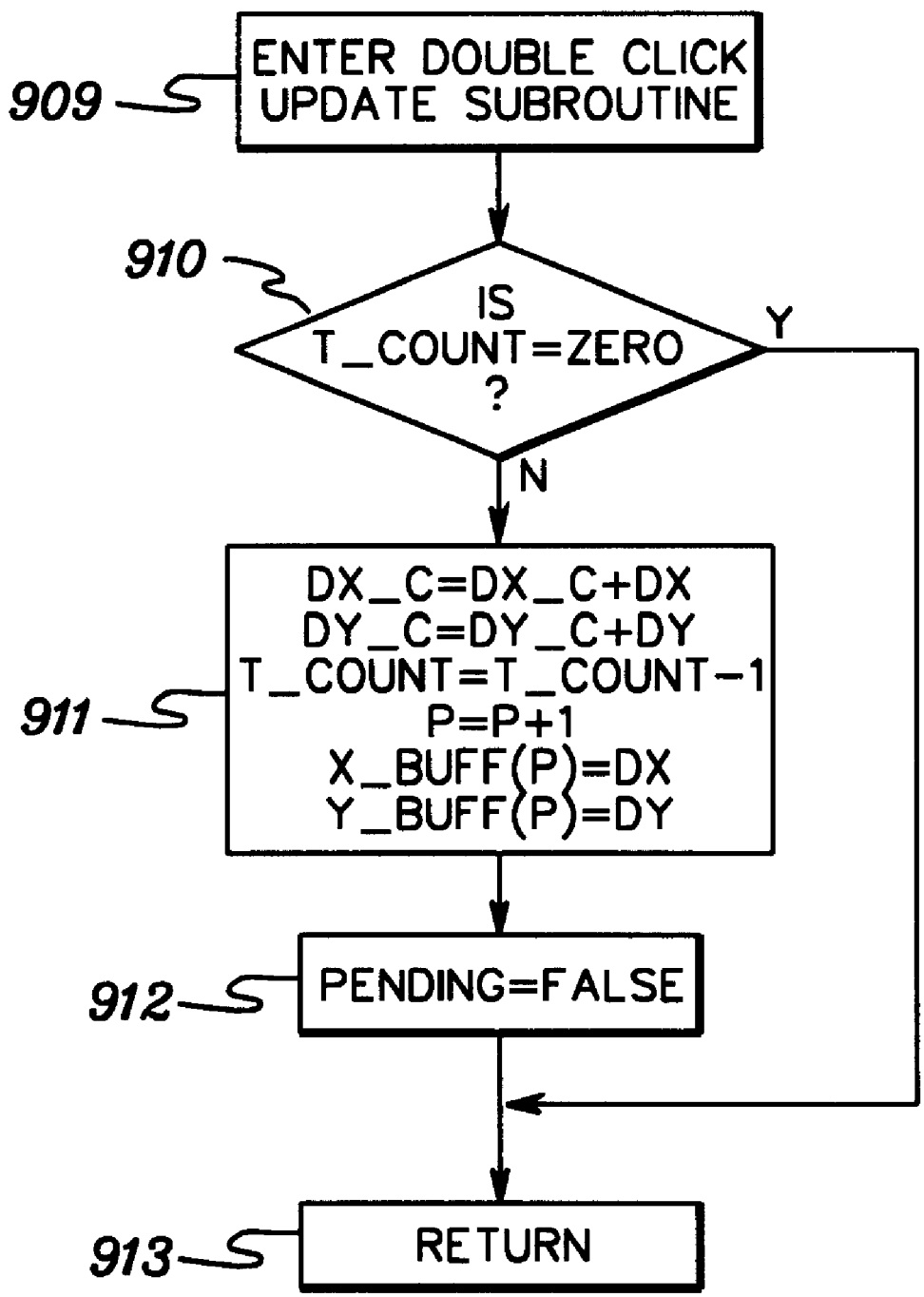

The double click processing presented herein uses two widely adjustable parameters stored in the adapter to recognize a more generous double click. It then sends a perfect double click to the computer, i.e., two rapid clicks with zero apparent-motion. One embodiment of this process, which takes advantage of the fixed loop time, Ts, is shown in FIGS. 9a and 9b. Note that, at least for the Windows™ operating system, the timing and distance measurements appear to start and end at a button contact, i.e., the button releases are ignored.

The double click processing makes use of the two subroutines shown in FIGS. 9a and 9b. The subroutine of FIG. 9a is entered (at 901) if and only if the left button changes from up to down. Thus, it should be called following the execution of algorithm A1, at step 43 of FIG. 4, after the buttons have been tested for time duration. Subroutine 901 first determines if the button depression is the first or second of a potential double click. If the latter, it determines if the double click was satisfactory, and if so, sends a perfect one (two clicks in rapid sequence with no motion) to the computer. Prior to sending the clicks, it returns the cursor to its position at the first click in case of intervening mouse motion. The subroutine of FIG. 9b is called every loop time in step 49 of FIG. 4, to keep track of time and distance.

The variables used by the two subroutines are listed 900 in FIG. 9a. When the double-click test subroutine is entered 901, the variable PENDING is tested to see if a double-click is already in progress 902. If not, the processing marks the beginning of a potential double-click 903. Thus, variables DX_C and DY_C, which are used to keep track of accumulated X and Y motion, respectively, are initialized to zero, while counter T_COUNT is initialized to T_TOL, which is the maximum allowed time for a double_click now in progress. Index value (see below) P is also set to 0, and the subroutine exits.

Referring to FIG. 9b, the double-click update subroutine is entered 909 once per loop through the main program. Thus, it is called in step 48 of FIG. 4. The value of T_COUNT is tested 910, and, if it has been reduced to zero, the subroutine is terminated, exiting at 913. Otherwise, T_COUNT is decremented, any X and Y motion DX and DY since the last loop is accumulated in DX_C and DY_C, the index P is incremented, and the values of DX and DY are stored in buffers X_BUFF and Y_BUFF at index P (see below) 911. Because of the test at 910, T_COUNT will decrease from its initial value T_TOL by one each loop through the main program (e.g., 25 ms) until it reaches 0.

Referring back to FIG. 9a, if the subroutine is entered when a potential double-click is in progress, then PENDING will have been true 902. Processing will then see if a valid double-click has occurred 904. This requires that T_COUNT not have been decremented to zero, and that the accumulated motion DX_C and DY_C be within tolerance XY_TOL. In 904, ABS( ) represents the absolute value of the number in parentheses, as these can be of either sign. If either of the 3 tests of step 904 fails, then the double_click is rejected, and step 905 is executed. This resets PENDING to enable a new double-click to be detected and the subroutine exits. If the tests at 904 are satisfactory, processing generates a perfect double-click 906. First, though, the cursor is repositioned to its location at the first button-down event, as this is presumably where the mouse user wanted it. This is done by simply transmitting the contents of the buffers X_BUFF and Y_BUFF to the computer sequentially, with reversed sign and a button-up indication. Note that, at this point, the computer has not yet received the second button-down, and that there is no way to know if the computer's double-click timing algorithm will accept or reject the next button-down transmission as a valid double click. If it were accepted, then sending the perfect double click would result in two valid double clicks. Therefore, a long time delay, e.g., on the order of 400 ms, is added 906. Then, four data packets are sent, with the X and Y motion set to zero, and the left buttons state set, in sequence, to down, up, down and up. This is accepted by the computer as a double click. The variables T_COUNT and PENDING are then set to zero and "false" to allow the next double-click to be detected, and the subroutine exits 907.

Note that this double click processing A4 and the stable point processing A3 interfere with one another, i.e., either can be used, but not both.

User Preferences

Each algorithm has one or more parameters which can be varied to suit a particular user's requirements. In addition, not all features are needed or wanted by each user, so an additional parameter is desirable to enable or disable each feature. There are several ways to select the necessary parameters. One method has already been described, that of selector switches connected to the adapter's input pins. Many of the individuals in most need of the adapter would have a difficult time operating the large number of small switches needed to fine-tune all the parameters. However, it is feasible to store a moderate number of typical predefined profiles, one of which can be selected with a small number of switches. For example, 5 switches allow selection from 32 profiles.

An alternative, which can be combined with the profile method, is to install a program in the computer which can communicate with the adapter through the mouse port to set the parameters. The parameters can then be stored in a small electrically erasable memory (EEPROM) for later recall. Such communication is possible because the software/hardware in the computer is required to transmit certain data bytes to the mouse to initialize it. Some of these bytes represent commands which are obsolete but still made available to maintain compatibility with older software. If sent to the mouse, they can be intercepted by the adapter and used to set customized parameters, and to cause them to be stored in the EEPROM. If combined with profile switches, one switch combination can be used to select the customized profile.

As an example of how to set parameters, the use of two unused commands is briefly described. These commands, "set scaling 2:1" and "set scaling 1:1", were intended to select from a linear and a nonlinear relation between mouse movement and mouse output, which is now done in the computer's device drivers. One command can instead be interpreted by the adapter's processor as a logical "1" and the other as a logical "0". A string of 16 of these, e.g., sent to the mouse can be decoded by the adapter into one byte to select the parameter to be modified, and a second byte representing the value of the parameter. Many other schemes will occur to those versed in the art. Finally, note that there will be occasions when a user without hand control problems will want to use the mouse. This can be accomplished by adding a single switch sensed by the adapter, which can simply result in the passing of unmodified mouse data to the computer.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

It should be understood that the foregoing description is only illustrative of the invention. Various alternatives and modification scan be devised by those skilled in the art without departing from the spirit of the invention. Accordingly, the present invention is intended to embrace all such alternatives, modifications, and variances which fall within the scope of the following claims.

What is claimed is:

1. A method of processing variable data produced by a pointing device for input to a computer, said method comprising:

ascertaining user inputted variable data produced by the pointing device;

performing external to the computer at least one of motion data processing or button data processing on the user inputted variable data to obtain modified user inputted variable data;

formatting, if necessary, the modified user inputted variable data to a standard format used for communicating data from the pointing device to the computer; and transmitting the formatted, modified user inputted variable data to the computer.

2. The method of claim 1, wherein said performing is transparent to the computer.

3. The method of claim 1, wherein the variable data comprises variable motion data or button data.

4. The method of claim 3, wherein said performing and said formatting are performed external to the pointing device in an adapter in communication with the pointing device and the computer.

5. The method of claim 1, wherein said performing and said formatting are performed within the pointing device.

6. The method of claim 1, wherein said at least one of motion data processing or button data processing comprises processing to accomplish at least one of:

filtering to reduce coordinate deviations from a desired path caused by unintended movements of said pointing device imparted by a user thereof;

removal of unintentional rapid button transitions of said pointing device imparted by a user thereof;

look-back processing to correct for unintentional pointer coordinate motion induced by operation of buttons of said pointing device by a user thereof; and detection of button double-clicks using relaxed requirements on motion and timing, and transmission of acceptable double-clicks to said computer.

7. The method of claim 6, wherein said at least one of motion data processing or button data processing comprises processing to accomplish at least some of:

filtering to reduce coordinate deviations from a desired path caused by unintended movements of said pointing device imparted by a user thereof;

removal of unintentional rapid button transitions of said pointing device imparted by a user thereof;

look-back processing to correct for unintentional pointer coordinate motion induced by operation of buttons of said pointing device by a user thereof; and detection of button double-clicks using relaxed requirements on motion and timing, and transmission of acceptable double-clicks to said computer.

8. The method of claim 6, wherein said at least one of motion data processing or button data processing comprises smoothing processing, and wherein said variable data comprises coordinate data, said smoothing processing comprising processing to smooth the coordinate data by one of recursive or non-recursive filtering operations applied to incremental coordinates produced by the pointing device, and wherein said formatting includes converting increments to be sent to the computer by correcting for roundoff thereof using accumulated roundoff errors.

9. The method of claim 6, wherein said look-back processing comprises storing a record of coordinate increments in at least one circular stack, checking said at least one circular stack for a region of minimal coordinate motion after a button change, and correcting for unintended motion by transmission of corrected increments to said computer based on increments stored in said at least one circular stack.

10. The method of claim 6, wherein said detection of button double-clicks processing includes using a record of coordinate increments in at least one linear stack recorded between a first button click and a second button click, checking time and distance between said first button click and said second button click to detect a valid double-click, restoring cursor location at the time of the second button click to its position at the time of the first button click if a valid double-click is detected, using data from the at least one stack, and transmitting a correct double-click to the computer.

11. The method of claim 1, wherein said at least one of motion data processing or button data processing employs at least one user selected parameter, and wherein said method further comprises allowing the user to input said user selected parameter.

12. The method of claim 11, wherein said allowing comprises adjusting said at least one user selected parameter via the computer, said adjusting including communicating said at least one user selected parameter from the computer to an adapter disposed external to the computer, wherein said method of claim 1 is implemented within the adapter.

13. The method of claim 1, further in combination with providing a user with the ability to deselect the processing of claim 1, thereby allowing unmodified user inputted variable data to be transmitted to the computer.

14. A method of processing variable data produced by a pointing device for input to a computer, said method comprising:

receiving user inputted variable data produced by the pointing device;

performing external and transparent to the computer at least one of motion data processing or button data processing on the user inputted variable data to obtain modified user inputted variable data, wherein said at least one of motion data processing or button data processing comprises processing to accomplish at least one of:

filtering to reduce coordinate deviations from a desired path caused by unintended movements of said pointing device imparted by a user thereof;

removal of unintentional rapid button transitions of said pointing device imparted by a user thereof;

look-back processing to correct for unintentional pointer coordinate motion induced by operation of buttons of said pointing device by a user thereof; and detection of button double-clicks using relaxed requirements on motion and timing, and transmission of acceptable double-clicks to said computer;

formatting, if necessary, the modified user inputted variable data to a standard format used for communicating data from the pointing device to the computer; and transmitting the formatted, modified user inputted variable data to the computer.

15. The method of claim 14, further comprising performing said method of processing within an adapter disposed in a communication path between the pointing device and the computer.

16. The method of claim 14, further comprising performing said method of processing within the pointing device prior to transfer of data to the computer.

17. The method of claim 14, wherein said at least one of motion data processing or button data processing comprises smoothing processing, and wherein said variable data comprises coordinate data, said smoothing processing comprising processing to smooth the coordinate data by one of recursive or non-recursive filtering operations applied to incremental coordinates produced by the pointing device, and wherein said formatting includes converting increments to be sent to the computer by correcting for roundoff thereof using accumulated roundoff errors.

18. The method of claim 14, wherein said look-back processing comprises storing a record of coordinate increments in at least one circular stack, checking said at least one circular stack for a region of minimal coordinate motion after a button change, and correcting for unintended motion by transmission of corrected increments to said computer based on increments stored in said at least one circular stack.

19. The method of claim 14, wherein said detection of button double-clicks processing includes using a record of coordinate increments in at least one linear stack recorded between a first button click and a second button click, checking time and distance between said first button click and said second button click to detect a valid double-click, restoring cursor location at the time of the second button click to its position at the time of the first button click if a valid double-click is detected, using data from the at least one stack, and transmitting a correct double-click to the computer.

20. The method of claim 14, wherein said at least one of motion data processing or button data processing employs at least one user selected parameter, and wherein said method further comprises allowing the user to input said user selected parameter.

21. The method of claim 20, wherein said allowing comprises adjusting said at least one user selected parameter via the computer, said adjusting including communicating said at least one user selected parameter from the computer to an adapter disposed external to the computer, wherein said method of claim 1 is implemented within the adapter.

22. The method of claim 21, further in combination with providing a user with the ability to deselect the processing of claim 1, thereby allowing unmodified user inputted variable data to be transmitted to the computer.

23. A system for processing variable data produced by a pointing device for input to a computer, said system comprising:

means for ascertaining user inputted variable data produced by the pointing device;

means for performing external to the computer at least one of motion data processing or button data processing on the user inputted variable data to obtain modified user inputted variable data;

means for formatting, if necessary, the modified user inputted variable data to a standard format used for communicating data from the pointing device to the computer; and means for transmitting the formatted, modified user inputted variable data to the computer.

24. The system of claim 23, wherein said means for performing is transparent to the computer.

25. The system of claim 23, wherein the variable data comprises variable motion data or button data.

26. The system of claim 25, wherein said means for performing and said means for formatting are performed external to the pointing device in an adapter in communication with the pointing device and the computer.

27. The system of claim 23, wherein said means for performing and said means for formatting are performed within the pointing device.

28. The system of claim 23, wherein said at least one of motion data processing or button data processing comprises processing to accomplish at least one of:

filtering to reduce coordinate deviations from a desired path caused by unintended movements of said pointing device imparted by a user thereof;

removal of unintentional rapid button transitions of said pointing device imparted by a user thereof;

look-back processing to correct for unintentional pointer coordinate motion induced by operation of buttons of said pointing device by a user thereof; and detection of button double-clicks using relaxed requirements on motion and timing, and transmission of acceptable double-clicks to said computer.

29. The system of claim 28, wherein said at least one of motion data processing or button data processing comprises smoothing processing, and wherein said variable data comprises coordinate data, said smoothing processing comprising means for processing to smooth the coordinate data by one of recursive or non-recursive filtering operations applied to incremental coordinates produced by the pointing device, and wherein said means for formatting includes means for converting increments to be sent to the computer by correcting for roundoff thereof using accumulated roundoff errors.

30. The system of claim 28, wherein said look-back processing comprises means for storing a record of coordinate increments in at least one circular stack, for checking said at least one circular stack for a region of minimal coordinate motion after a button change, and for correcting for unintended motion by transmission of corrected increments to said computer based on increments stored in said at least one circular stack.

31. The system of claim 28, wherein said detection of button double-clicks processing includes means for using a record of coordinate increments in at least one linear stack recorded between a first button click and a second button click, for checking time and distance between said first button click and said second button click to detect a valid double-click, for restoring cursor location at the time of the second button click to its position at the time of the first button click if a valid double-click is detected, for using data from the at least one stack, and for transmitting a correct double-click to the computer.

32. The system of claim 23, wherein said at least one of motion data processing or button data processing employs at least one user selected parameter, and wherein said system further comprises means for allowing the user to input said user selected parameter.

33. The system of claim 32, wherein said means for allowing comprises means for adjusting said at least one user selected parameter via the computer, said means for adjusting including means for communicating said at least one user selected parameter from the computer to an adapter disposed external to the computer, wherein said system of claim 23 is implemented within the adapter.

34. The system of claim 23, further in combination with means for providing a user with the ability to deselect the processing of claim 1, thereby allowing unmodified user inputted variable data to be transmitted to the computer.

35. Apparatus for processing variable data produced by a pointing device for input to a computer, said apparatus comprising:

an adapter, said adapter including at least one logic element configured to:

ascertain user inputted variable data produced by the pointing device;

perform external to the computer at least one of motion data processing or button data processing on the user inputted variable data to obtain modified user inputted variable data;

format, if necessary, the modified user inputted variable data to a standard format used for communicating data from the pointing device to the computer; and transmit the formatted, modified user inputted variable data to the computer.

36. A system for processing variable data produced by a pointing device for input to a computer, said system comprising:

means for ascertaining user inputted variable data produced by the pointing device;

means for performing external and transparent to the computer at least one of motion data processing or button data processing on the user inputted variable data to obtain modified user inputted variable data, wherein said at least one of motion data processing or button data processing comprises processing to accomplish at least one of:

filtering to reduce coordinate deviations from a desired path caused by unintended movements of said pointing device imparted by a user thereof;

removal of unintentional rapid button transitions of said pointing device imparted by a user thereof;

look-back processing to correct for unintentional pointer coordinate motion induced by operation of buttons of said pointing device by a user thereof; and detection of button double-clicks using relaxed requirements on motion and timing, and transmission of acceptable double-clicks to said computer;

means for formatting, if necessary, the modified user inputted variable data to a standard format used for communicating data from the pointing device to the computer; and means for transmitting the formatted, modified user inputted variable data to the computer.

37. The system of claim 36, further comprising means for performing said system of processing within an adapter disposed in a communication path between the pointing device and the computer.

38. The system of claim 36, further comprising means for performing said system of processing within the pointing device prior to transfer of data to the computer.

39. The system of claim 36, wherein said at least one of motion data processing or button data processing comprises smoothing processing, and wherein said variable data comprises coordinate data, said smoothing processing comprising means for processing to smooth the coordinate data by one of recursive or non-recursive filtering operations applied to incremental coordinates produced by the pointing device, and wherein said means for formatting includes means for converting increments to be sent to the computer by correcting for roundoff thereof using accumulated roundoff errors.

40. The system of claim 36, wherein said look-back processing comprises means for storing a record of coordinate increments in at least one circular stack, for checking said at least one circular stack for a region of minimal coordinate motion after a button change, and for correcting for unintended motion by transmission of corrected increments to said computer based on increments stored in said at least one circular stack.

41. The system of claim 36, wherein said detection of button double-clicks processing includes means for using a record of coordinate increments in at least one linear stack recorded between a first button click and a second button click, for checking time and distance between said first button click and said second button click to detect a valid double-click, for restoring cursor location at the time of the second button click to its position at the time of the first button click if a valid double-click is detected, for using data from the at least one stack, and for transmitting a correct double-click to the computer.

42. The system of claim 36, wherein said at least one of motion data processing or button data processing employs at least one user selected parameter, and wherein said system further comprises means for allowing the user to input said user selected parameter.

43. The system of claim 42, wherein said means for allowing comprises means for adjusting said at least one user selected parameter via the computer, said means for adjusting including means for communicating said at least one user selected parameter from the computer to an adapter disposed external to the computer, wherein said system of claim 36 is implemented within the adapter.

44. The system of claim 43, further in combination with means for providing a user with the ability to deselect the processing of claim 36, thereby allowing unmodified user inputted variable data to be transmitted to the computer.

45. At least one program storage device readable by a machine, tangibly embodying at least one program of instructions executable by the machine to perform a method of processing variable data produced by a pointing device for input to a computer, said method comprising:

ascertaining user inputted variable data produced by the pointing device;

performing external to the computer at least one of motion data processing or button data processing on the user inputted variable data to obtain modified user inputted variable data;

formatting, if necessary, the modified user inputted variable data to a standard format used for communicating data from the pointing device to the computer; and transmitting the formatted, modified user inputted variable data to the computer.

46. At least one program storage device readable by a machine, tangibly embodying at least one program of instructions executable by the machine to perform a method of processing variable data produced by a pointing device for input to a computer, said method comprising:

receiving user inputted variable data produced by the pointing device;

performing external and transparent to the computer at least one of motion data processing or button data processing on the user inputted variable data to obtain modified user inputted variable data, wherein said at least one of motion data processing or button data processing comprises processing to accomplish at least one of:

filtering to reduce coordinate deviations from a desired path caused by unintended movements of said pointing device imparted by a user thereof;

removal of unintentional rapid button transitions of said pointing device imparted by a user thereof;

look-back processing to correct for unintentional pointer coordinate motion induced by of buttons of said pointing device by a user thereof; and detection of button double-clicks using relaxed requirements on motion and timing, and transmission of acceptable double-clicks to said computer;

formatting, if necessary, the modified user inputted variable data to a standard format used for communicating data from the pointing device to the computer; and transmitting the formatted, modified user inputted variable data to the computer.

* * * * *

UNITED STATES PATENT AND TRADEMARK OFFICE
CERTIFICATE OF CORRECTION

PATENT NO.     : 6,650,313 B2
DATED          : November 18, 2003
INVENTOR(S)    : Levine et al.

It is certified that error appears in the above-identified patent and that said Letters Patent is hereby corrected as shown below:

Column 20,
Line 42, insert the word -- operation -- before the words "of buttons"

Signed and Sealed this

Thirteenth Day of April, 2004

JON W. DUDAS
*Acting Director of the United States Patent and Trademark Office*